March 17, 1925.
A. MARRA
TOASTER
1,530,387
Original Filed Oct. 15, 1923
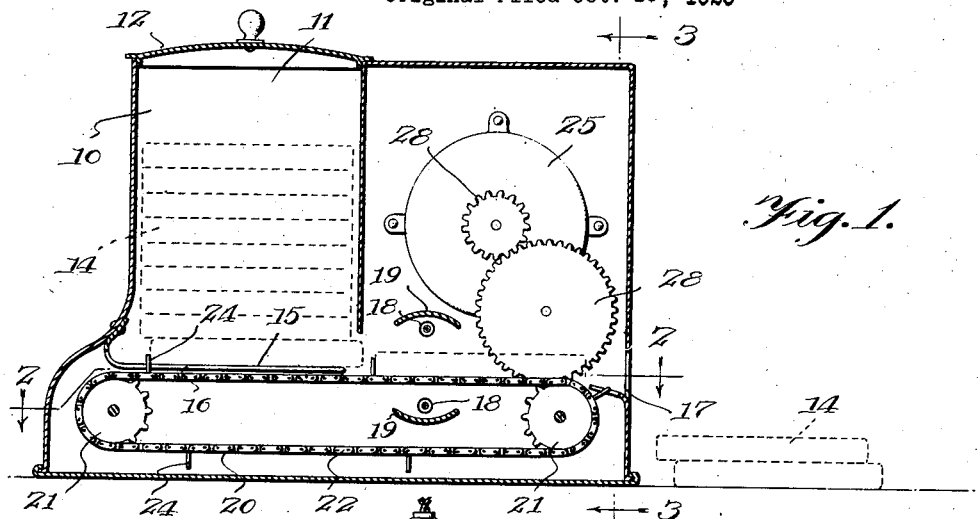
Fig. 1.
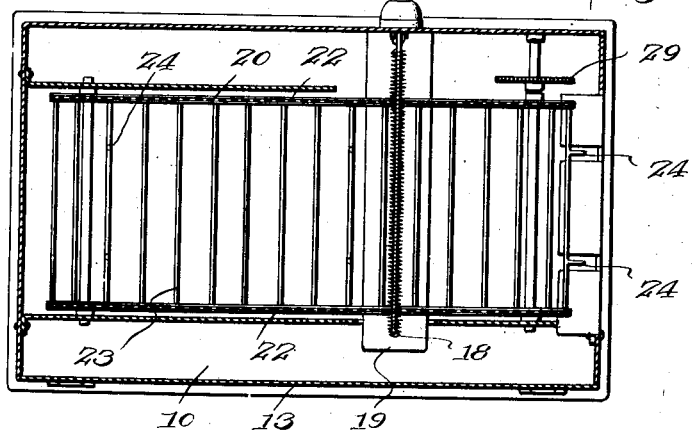
Fig. 2.
Fig. 3.
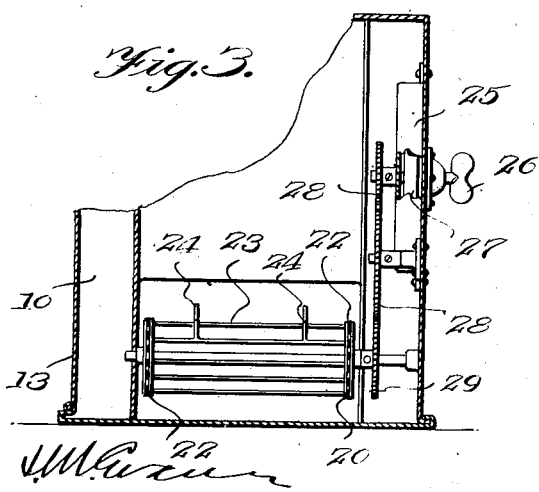
Fig. 4.
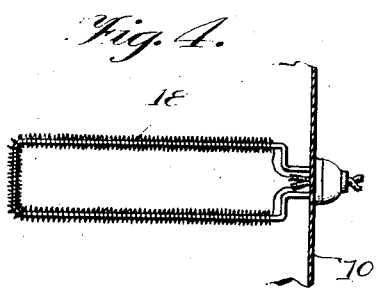
Anthony Marra
INVENTOR
BY Victor J. Evans
ATTORNEY
WITNESS:

Patented Mar. 17, 1925.

1,530,387

UNITED STATES PATENT OFFICE.

ANTHONY MARRA, OF BROOKLYN, NEW YORK.

TOASTER.

Application filed October 15, 1923, Serial No. 668,727. Renewed February 7, 1925.

*To all whom it may concern:*

Be it known that I, ANTHONY MARRA, a citizen of the United States, residing at Brooklyn, in the county of Kings and State of New York, have invented new and useful Improvements in Toasters, of which the following is a specification.

This invention relates to toasters and more particularly to an automatic toaster.

The principal object of the invention is to provide a toaster wherein the product to be toasted such as bread is placed in the same in stack formation after which the bread is ejected from the same in its toasted or finished condition there being no need of watching the toast to see that the same does not burn.

Another object of the invention is to provide a device of a character mentioned which includes a receptacle or hopper for a number of slices of bread, and means conveying the bread from the receptacle through a pair of spaced heating units in timed relation to the heating capacity of the units and then discharging the slices of bread singly after the same have passed between the coils.

A further object of the invention is to provide an automatic toaster which is simple in construction, cheap of manufacture and highly efficient for the purpose intended.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a vertical sectional view through my improved automatic toaster.

Figure 2 is a horizontal sectional view on the line 2—2 of Figure 1.

Figure 3 is a transverse sectional view on the line 3—3 of Figure 1.

Figure 4 is a detail view of the heating coil.

Referring more particularly to the drawing, the reference numeral 10 designates a housing in which is enclosed the necessary mechanism for carrying out my invention. The housing 10 includes a hopper or receptacle 11 having a removable cover 12, and a hinged door 13 on one of its side walls, so that access may be had to the inside of the housing and to also receive the material to be toasted, which in the present instance is shown in the nature of a plurality of slices of bread 14, arranged in stack formation. The bottom of the hopper is provided with a bottom 15, the same being provided with longitudinal slots 16, for a purpose to be presently described. A discharge opening 17 is arranged in the housing at one end thereof and mounted between the hopper 11 and the discharge opening 17 is a pair of spaced electric heating coils 18 of the type now employed in electric toasters, which coils are arranged in spaced relation to each other and extend transversely within the housing. Deflector plates 19 partially surround the coils 18 so as to direct the heat toward each other for a purpose to be presently explained. A conveying means 20 is mounted beneath the hopper 11 and is adapted to move the toast from the hopper 11 and pass the same singly through the heating coils 18 and out of the discharge opening 17. The conveyor 20 includes spaced rollers 21 over which endless belts 22 are adapted to pass, the belts 22 being arranged in spaced relation and are connected together by means of transverse rods 23 which serve to support the slice of bread when being conveyed in the manner above mentioned. The belts 22 are provided with upstanding fingers 24, the same being arranged in spaced relation, and are adapted to enter the slots 16 in the bottom of the receptacle so as to pick up the slice of bread and carry the same through the heating coils in the direction of the arrow as shown in Figure 1 of the drawings. It will be noted that one of the leads of the conveyor belts pass between said heating units 19.

Any suitable mechanism 25 may be employed for transmitting power to the conveyor but in the present instance the same is shown as a clock mechanism which includes a winding stem 26, a spring 27 which is adapted to be wound, and a train of gears 28 which are in mesh with a gear 29 on one of the shafts which carry the rollers 21. It will be seen that by winding the spring 25 to put the same under tension, power will be taken from the train of gears 28 into the conveyor. The speed of the conveyor is adapted to be regulated in timed relation to the heating capacity of the coils, or the heating capacity of the coils may be regulated in accordance with the speed of the conveyor, or in other words the two are adapted to co-act so that after the bread is passed through the coils 18 the same will be thoroughly toasted on each side, the heat from the coils being deflected against both sides of the bread at an even temperature so as to toast both sides simultaneously after which the bread is ejected out of the discharge opening 17.

It will be seen from the above construction that there is shown a device for toasting the bread, wherein the bread may be inserted and ejected therefrom in a toasted condition, it being unnecessary to constantly watch the toast to prevent the same from burning as the device is automatic in all respects other than a motor or winding means for operating the conveyor.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a device of the class described, the combination of a conveyor, means for operating said conveyor, means for supporting a plurality of products in stack formation above said conveyor, a heating unit, and selective means on said conveyor for engagement with the lowermost of said products for removing the same from the stack and passing it through said heating unit, and for ejecting the same therefrom.

2. In a device of the class described, the combination of a conveyor, means for operating said conveyor, a heating coil mounted above and below one of the leads of said conveyor, deflectors disposed adjacent each heating coil to direct the heat in a direction of the lead of the conveyor, means for supporting a number of slices of bread in stack formation above said conveyor, and selective means on said conveyor for engagement with the lowermost slice of bread to move the same from the stack and pass the same between said heating coils.

3. A device of the class described comprising a casing, a compartment in said casing having a slotted bottom, said compartment adapted to receive a plurality of slices of bread disposed horizontally therein, and an endless belt disposed below said compartment, elements extending from said endless belt for co-action with the respective slices of bread in said compartment and for passage through the slotted bottom, means for operating said endless belt, a heating element disposed on opposite sides of one lead of said endless belt for simultaneously heating opposite sides of the slice of bread as it passes therethrough, and a discharge opening formed in one end wall of said casing and arranged in horizontal alignment with the top of said endless belt and through which the bread is automatically ejected.

In testimony whereof I have affixed my signature.

ANTHONY MARRA.